Sept. 17, 1929.   E. W. WEBB   1,728,459
TRUCK AND LATERAL MOTION DEVICE
Filed Aug. 5, 1927    3 Sheets-Sheet 1
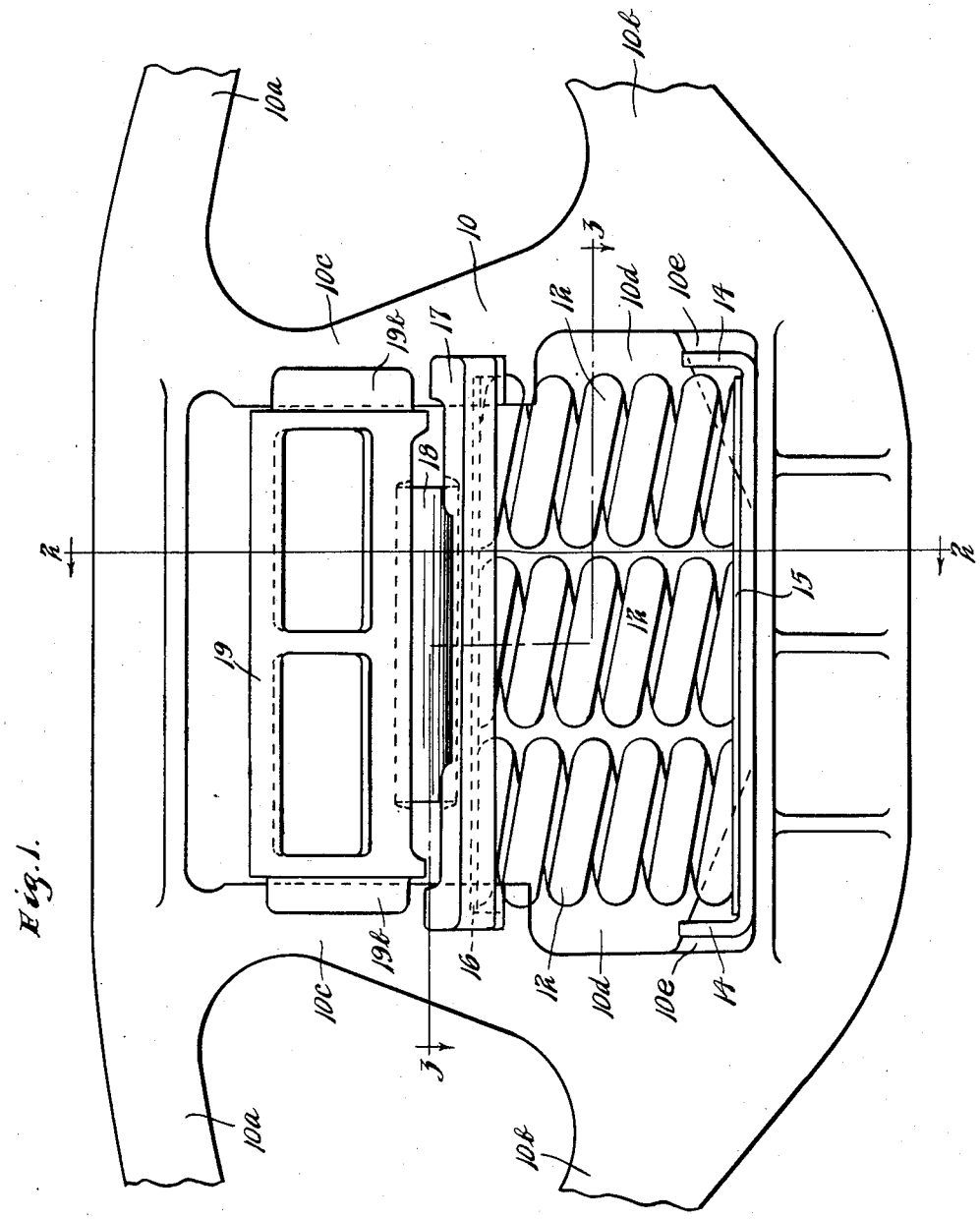
INVENTOR.
EDWIN W. WEBB.
BY HIS ATTORNEYS.

Sept. 17, 1929.  E. W. WEBB  1,728,459
TRUCK AND LATERAL MOTION DEVICE
Filed Aug. 5, 1927  3 Sheets-Sheet 2
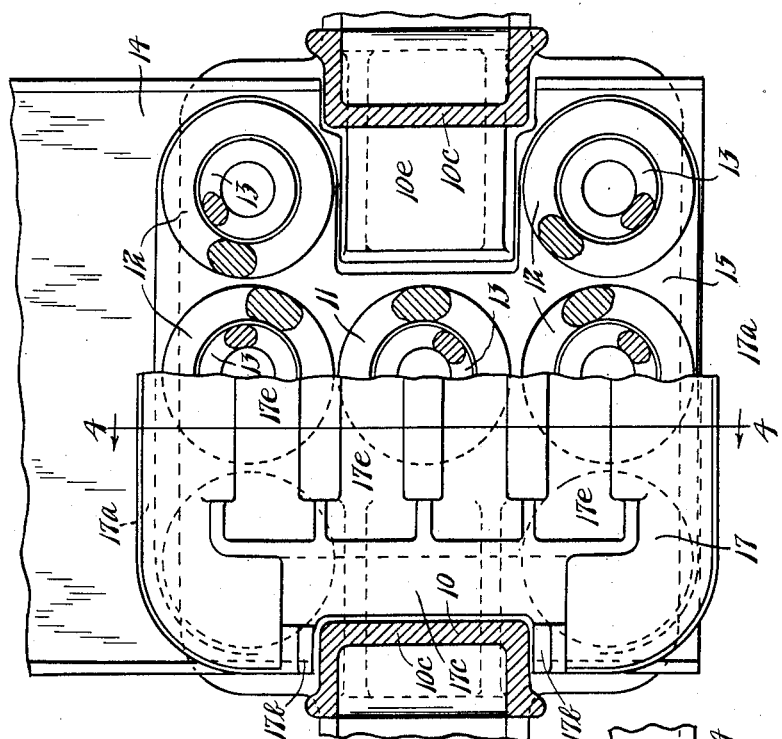
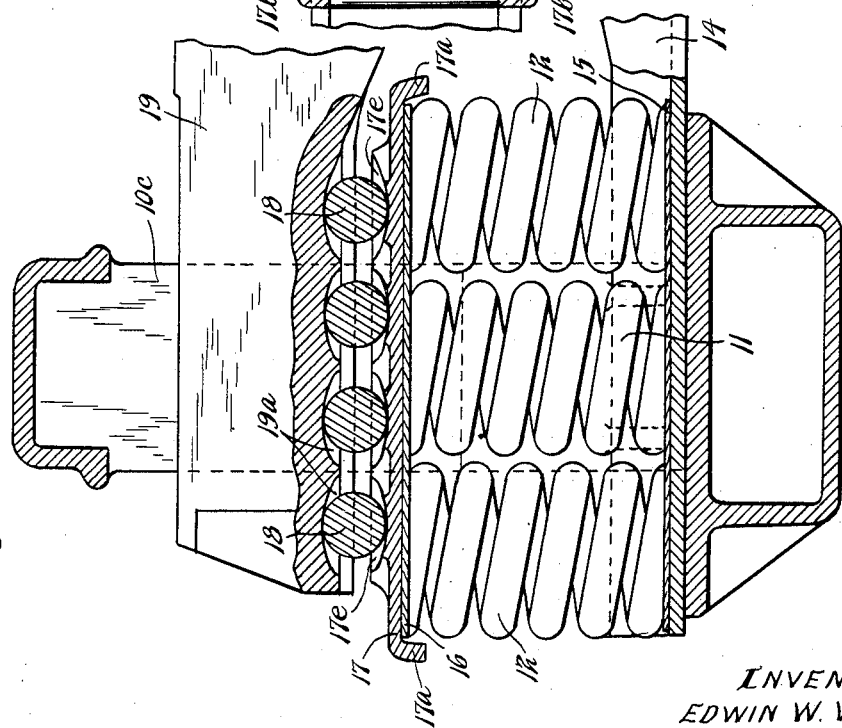
INVENTOR.
EDWIN W. WEBB.
BY HIS ATTORNEYS.

Sept. 17, 1929.  E. W. WEBB  1,728,459
TRUCK AND LATERAL MOTION DEVICE
Filed Aug. 5, 1927  3 Sheets-Sheet 3
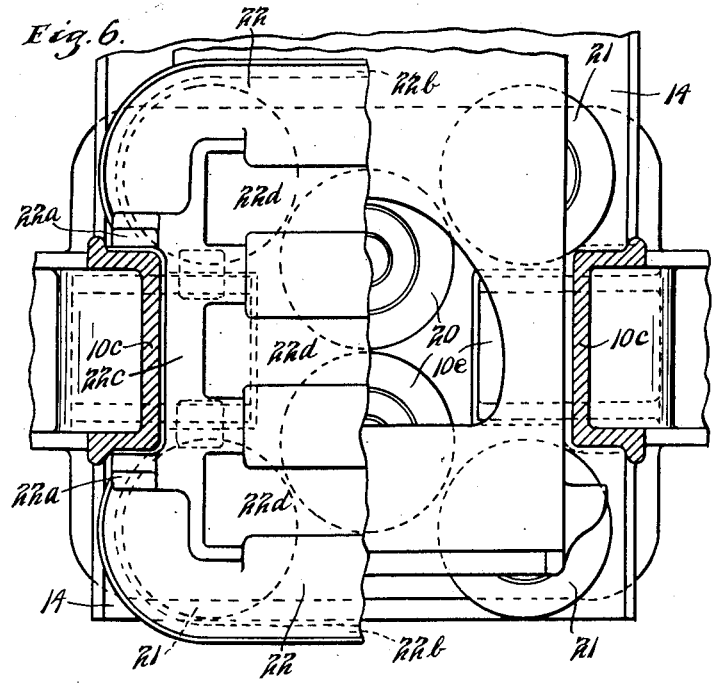
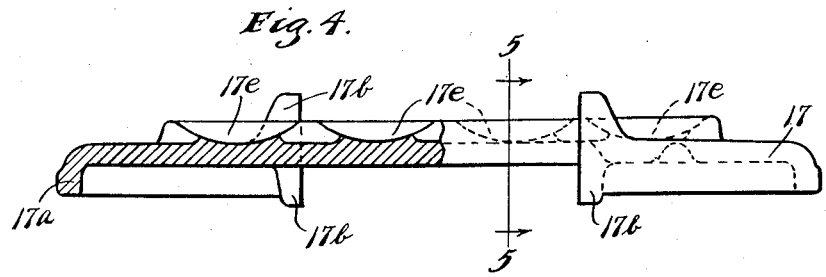
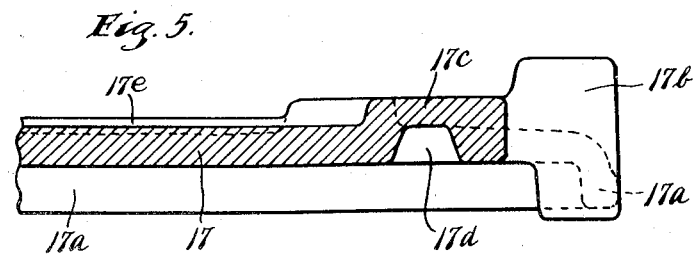
INVENTOR.
EDWIN W. WEBB.
BY HIS ATTORNEYS.

Patented Sept. 17, 1929

1,728,459

UNITED STATES PATENT OFFICE

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY

TRUCK AND LATERAL-MOTION DEVICE

Application filed August 5, 1927. Serial No. 210,818.

This invention relates to a car truck structure, and particularly to the spring arrangement and the lateral motion devices cooperating therewith. In the cast steel side frames which are now being used in car trucks, it is desirable to have the metal in the various members disposed in the line of stress. The side frame used with the present invention has reinforcing web plates or gussets extending inwardly into the spring seat opening, these gussets being disposed in the line of stress in the tension member. Springs therefore cannot be located on these gussets, the top surfaces of which are inclined and it is necessary to devise a novel arrangement of springs and lateral motion devices.

It is an object of the invention therefore to provide a car truck structure comprising a lateral motion device adapted to a side frame having members extending inwardly from the sides of the spring seat opening having a spring plank disposed in said opening arranged to support one or more springs substantially centrally between the bolster columns and rows of two or more springs at each side of the bolster columns, said latter springs and spring plank extending outwardly of the faces of said bolster columns toward the ends of the side frame.

It is another object of the invention to provide a car truck structure comprising a side frame having spaced bolster columns and a spring seat opening with members extending inwardly from the sides of said opening, a spring support for supporting a plurality of springs, certain of which are disposed to extend outwardly beyond the faces of the bolster columns, together with a roller seat disposed over said springs and having guide means extending at each side of the bolster columns.

It is still a further object of the invention to provide a car truck structure having bolster supporting springs disposed at each side of the bolster columns of the side frame and extending outwardly beyond the faces of said columns together with a roller supporting plate disposed over said springs and having column guides at the sides of the bolster columns, together with side flanges connecting the column guide at one side of the column with the column guide of the opposite column at the same side of the side frame, said plate having means for carrying bolster supporting rollers in its upper surface.

It is still another object of the invention to provide a truck structure having bolster supporting springs disposed at the sides of the bolster columns of the side frame and extending outwardly beyond the faces of said columns together with a roller supporting plate having column guides at each side of the bolster columns and disposed over said springs, said plate having a heavy reinforcing section connecting the column guides at each side thereof and disposed adjacent the column faces, said plate having roller supporting grooves extending between said sections.

These and other objects and advantages of the invention will be fully set forth in the following description made in connection with the accompanying drawings in which like characters refer to like parts throughout the different views, and in which, Fig. 1 is a view in side elevation of the truck embodying the invention;

Fig. 2 is a vertical section taken on the line 2—2 of Fig. 1, as indicated by the arrows;

Fig. 3 is a horizontal section taken substantially on the line 3—3 of Fig. 1, as indicated by the arrows;

Fig. 4 is a vertical section with the roller plate taken on the line 4—4 of Fig. 3, as indicted by the arrows;

Fig. 5 is a vertical section taken on the line 5—5 of Fig. 4, as indicated by the arrows; and Fig. 6 is a view similar to Fig. 3, showing the invention as applied to a lighter truck.

Referring to the drawings, a truck structure for a freight car is shown comprising a side frame 10. This side frame is of the cast type and has compression members 10$^a$ and tension members 10$^b$. The side frame has the usual spaced bolster columns 10$^c$ having faces disposed toward each other, and the usual spring seat opening 10ᵈ below said column bars. Said frame has reinforcing members in the form of webs or gussets 10ᵉ which extend from the sides of the opening 10ᵈ inwardly and downwardly toward the surface of the spring seat or spring plank support. These webs or gussets are provided so as to be in the line of stress on the tension members 10ᵇ. With such members 10ᵉ the usual arrangement of springs cannot be had as the springs cannot be supported on the members 10ᵉ. There is room only for the width of one spring between the members 10ᵉ. As shown in Fig. 3, one spring 11 is disposed substantially centrally between the members 10ᵉ, and the bolster columns and two rows of springs 12 are provided disposed substantially at either side of the bolster columns. As shown in Fig. 3, the springs 12 are arranged in rows of three and it will be seen that the end springs in each row extend outwardly beyond the faces of the columns 10ᶜ. The springs 11 and 12 may have smaller springs 13 disposed within them, if desired. The spring plank 14 comprises a flat plate having upturned flanges at its ends, extending transversely through the side frame 10 seated on the bottom of the spring opening 10ᵈ, said plate, being illustrated as cut away to extend around the members 10ᵉ, as shown at the right of Fig. 3. The spring plank 14 has a thin spring supporting plate 15 thereon on which the springs 11 and 12 are directly seated. The springs are directly engaged at their tops by a similar spring plate 16 disposed between downwardly extending flanges 17ᵃ of a roller seat plate 17. This roller seat plate is of special construction and, as shown in Fig. 3, extends over the springs 11 and 12, flanges 17ᵃ extending downwardly around the outer side of the springs 12. It will be seen that plate 17 projects outwardly of the bolster column faces at each side of said columns and has column guides 17ᵇ at each side of the columns, the flanges 17ᵃ extending between the guides 17ᵇ disposed at the sides of opposite columns and the same side of the side frame. The plate 17 which is shown in detail in Figs. 4 and 5, has a rib or heavy reinforced section 17ᶜ extending between the column guides 17ᵇ which are disposed at the side of each column, said section or rib 17ᶜ being disposed close to the column face. Said rib 17ᶜ is provided in its bottom with one or more recesses 17ᵈ. The plate 17 is provided with a plurality of concave specially formed grooves 17ᵉ on its upper surface disposed between the sections 17ᶜ. These grooves support the bolster bearing rollers 18 on which the ends of the bolster 19 rest, said bolster having similar specially formed grooves 19ᵃ in its lower face. Said bolster is illustrated as having the column-engaging guides or stops 19ᵇ at each side.

In operation, the weight of the bolster and car body supported thereby, is carried on the springs 11 and 12 and endwise play of the bolster 19 transversely of the side frames is permitted by the rollers 18 moving in the grooves 17ᵉ and 19ᵃ. The bolster also has vertical movement relative to the side frames in the compression and expansion of the springs 11 and 12, the bolster being properly guided by the guide plates 19ᵇ. It is seen that the springs are all engaged by plates 16 and 17 and the weight of the bolster and supporting parts is equally distributed by these plates to all of the springs.

In Fig. 6, the invention is shown applied to a lighter truck, such as a fifty five ton truck, while that shown in the other figures is for a seventy ton truck.

In this figure, the two springs 20 used are disposed substantially centrally between the columns 10ᶜ and in the space between the gussets 10ᵉ, while two outer springs 21 are shown at each side of the bolster column. The same spring plank 14 is shown, but a smaller roller bearing plate 22 is used. This bearing plate is of sufficient size to extend over all of the springs 20 and 21 and has column guides 22ᵃ at each side of each bolster column. The plate also has downwardly extending flanges 22ᵇ extending down around the outer side of all of the springs and from the column guides on one side to the column guide on the opposite side. The plate also has heavy reinforcing sections or ribs 22ᶜ extending transversely of the column guides on its upper surface adjacent its edges and has roller receiving grooves 22ᵈ of special form extending between the ribs 22ᶜ, there being but three of these grooves shown. The operation of the device shown in Fig. 6 is the same as that already described for the truck shown in Figs. 1 to 3.

From the above description it is seen that applicant has provided a truck structure comprising a lateral motion device for the bolster and an efficient arrangement of the bolster supporting springs adapted for use in a side frame having means extending inwardly from the sides of the spring opening. An exceedingly strong side frame is thus used and all of the desired movements of the bolster are accommodated. The roller bearing plate is effectively supported and properly distributes the load to all of the springs. The invention has been amply demonstrated in actual practice and found to be very successful and efficient and the same is now being commercially made.

It will be understood that changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. In combination with a side frame having spaced bolster columns and a spring-receiving opening therebetween, a roller seat for a lateral motion car truck comprising a plate supported on a plurality of springs, said plate extending between the faces of said columns and having spring-engaging portions projecting outwardly at each side of each column longitudinally of said frame at the inner and outer sides of said frame, said plate having roller seats on its upper surface.

2. The combination with a side frame having spaced bolster columns and a spring-opening therebetween, of a roller plate for supporting a bolster for motion transversely of said frame, said plate extending between the faces of said columns and having column guides at each side of said columns beyond the faces thereof, a plate below said plate adapted to rest on a plurality of springs, some of which are disposed outwardly of said bolster columns, said first mentioned plate having a flange projecting downwardly about said last mentioned plate and around the outer sides of said springs.

3. The combination with a side frame having spaced bolster columns and a spring-opening therebetween, of a roller bearing plate adapted to be supported upon a plurality of springs disposed in said opening, said plate being substantially rectangular in shape but having rounded corners curved substantially on the curvature of said springs, said plate extending between said columns and having portions disposed over springs extending outwardly of the faces of said columns and disposed at the side of said columns, said plate having roller seats on its upper surface adapted to carry bolster supporting rollers.

4. In combination with a side frame having spaced bolster columns, a spring-receiving opening therebetween, a roller bearing plate adapted to be supported on a plurality of springs disposed in said opening, the spring engaging portion of said plate being wider than the distance between said columns and having column guides at each side of said columns, said plate having side flanges connecting one column guide with the opposite column guide at the inner side of said frame, said plate having roller seats on its upper surface.

5. In combination with a side frame having spaced bolster columns, and a spring-receiving opening therebetween, a roller bearing plate adapted to be supported on a plurality of springs disposed in said opening, the spring engaging portion of said plate being wider than the distance between said columns, said plate having a heavy reinforcing section extending between the column guides of the same column and disposed adjacent the face of said column, said plate having spaced parallel roller seats extending between said sections.

6. A truck structure having in combination, a side frame having spaced bolster columns and a spring-receiving opening therebetween, a plurality of springs disposed in said opening, certain of said springs being disposed beyond the sides of said columns and extending outwardly of the faces of said columns, and a roller supporting means extending over the tops of said springs and projecting beyond the faces of said columns at the sides thereof adapted to carry bolster supporting rollers.

7. A truck structure having in combination, a side frame having spaced bolster columns and a spring opening therebetween, a plurality of springs disposed in said opening, certain of said springs being disposed outwardly of the sides of said columns and extending outwardly of the faces of said columns, and a roller supporting plate extending over all of said springs and having a depending flange extending downwardly around the outer springs, said plate having column guides at each side of said columns and having roller receiving grooves in its upper surface.

8. A car truck having in combination, a side frame having bolster columns, a spring support extending beyond the faces of said columns and at the inner and outer sides thereof transversely of said frame, one or more springs disposed substantially centrally of said columns, rows of two or more springs disposed at the inner and outer sides of said columns respectively transversely of said frame, a roller seat disposed on said frame, a roller seat disposed on said frame, said springs having spring-engaging portions projecting at each side of said columns longitudinally of said frame, and rollers supported on said seat adapted to support a bolster for movement transversely of said frame.

In testimony whereof I affix my signature.

EDWIN W. WEBB.